(12) United States Patent
Poddar

(10) Patent No.: US 7,280,114 B2
(45) Date of Patent: Oct. 9, 2007

(54) LINE STIPPLE PATTERN EMULATION THROUGH TEXTURE MAPPING

(75) Inventor: Bimal Poddar, El Dorado Hills, CA (US)

(73) Assignee: Intel Corporation, Santa Clara, CA (US)

(*) Notice: Subject to any disclaimer, the term of this patent is extended or adjusted under 35 U.S.C. 154(b) by 178 days.

(21) Appl. No.: 10/611,270

(22) Filed: Jun. 30, 2003

(65) Prior Publication Data

US 2004/0263526 A1 Dec. 30, 2004

(51) Int. Cl.
*G09G 5/00* (2006.01)

(52) U.S. Cl. ............... 345/582; 345/583; 345/587; 345/588

(58) Field of Classification Search .......... 345/582, 345/583, 587, 588
See application file for complete search history.

(56) References Cited

U.S. PATENT DOCUMENTS

| | | | |
|---|---|---|---|
| 4,888,712 A | 12/1989 | Barkans et al. | |
| 5,585,863 A | 12/1996 | Hackett et al. | |
| 5,847,712 A * | 12/1998 | Salesin et al. | 345/582 |
| 6,052,129 A | 4/2000 | Fowler et al. | |
| 6,169,554 B1 | 1/2001 | Deering | |
| 6,333,744 B1 * | 12/2001 | Kirk et al. | 345/506 |
| 6,359,630 B1 | 3/2002 | Morse et al. | |
| 6,469,704 B1 * | 10/2002 | Johnson | 345/553 |
| 6,639,595 B1 | 10/2003 | Drebin et al. | |
| 6,788,312 B1 * | 9/2004 | Azar et al. | 345/694 |
| 2002/0130863 A1 | 9/2002 | Baldwin | |
| 2002/0130886 A1 * | 9/2002 | Baldwin | 345/611 |
| 2002/0167523 A1 * | 11/2002 | Taylor et al. | 345/582 |
| 2003/0067468 A1 * | 4/2003 | Duluk et al. | 345/506 |
| 2003/0164840 A1 | 9/2003 | O'Driscoll | 345/611 |

OTHER PUBLICATIONS

Woon-Sung Lee, et al., "A Driving Simulator As A Virtual Reality Tool", Department of Automotive Engineering, Kookmin University, Seoul, Korea, 6 pages, 1998.
Anthony Cataldo, "Intel's i740 Departs From The Norm To Improve 3-D Image Quality", May 27, 2003, EETimes, www.eetimes.com/news/98/993news/i740.html. May 27, 2003.
Intel Corporation, "Texture Maps 3D Primer", 6 pages, May, 27, 2003, http://www.intel.com/technology/3D/docs/TEXTURE.HTM.
http://www.techweb.com/encyclopeida/defineterm?term+graphicsaccelerator, "Graphics Accelerator", May 30, 2003, 2 pages.
http://oregonstate.edu/-2whiteran/mid-report.htm, "Video Card Architecture", May 27, 2003, 4 pages.
Paul Zimmons, "A Study of Graphics Architectures", silicon Graphics's InfiniteReality, Evans & Sutherlands's ESIG-4500, University of North Carolina's PixelFlow Graphics Supercomuter, Aug. 17, 1996, 41 pages.
Nvidia, "Cub Map OpenGL Tutorial," pp. 1-15, printed on May 27, 2003, http://nvidia.com/view.asp?IO=IO_20010830_4778.
Nvidia, "OpenGL Cube Map Texturing," pp. 18, 1999.
Addison-Wesley Publishing Company, Chapter 9 "Texture Mapping," pp. 41, 1990.

* cited by examiner

*Primary Examiner*—Matthew C. Bella
*Assistant Examiner*—Mike Rahmjoo
(74) *Attorney, Agent, or Firm*—Blakely, Sokoloff, Taylor & Zafman LLP

(57) ABSTRACT

A method is described to render a line stipple pattern in an ad hoc piecewise fashion by creating a texture map having information that represents the line stipple pattern. The method also includes, for each of a plurality of line primitives that each represent a different section of the line stipple pattern, mapping a section of the texture map's information to its corresponding line primitive.

23 Claims, 9 Drawing Sheets

| C | D | E | F |
|---|---|---|---|
| 8 | 9 | A | B |
| 4 | 5 | 6 | 7 |
| 0 | 1 | 2 | 3 |

FIG. 9C

| 8 | 9 | A | B | C | D | E | F |
|---|---|---|---|---|---|---|---|
| 0 | 1 | 2 | 3 | 4 | 5 | 6 | 7 |

FIG. 9D

LINE STIPPLE PATTERN EMULATION THROUGH TEXTURE MAPPING

FIELD OF INVENTION

The field of invention relates generally to graphics processing; and, more specifically to line stipple pattern emulation through texture mapping.

BACKGROUND

FIG. 1 shows an embodiment of a computing system. The exemplary computing system of FIG. 1 includes: 1) one or more processors 101; 2) a memory control hub (MCH) 102; 3) a system memory 103 (of which different types exist such as RDRAM, SDRAM, EDO RAM, etc,); 4) a cache 104; 5) an I/O control hub (ICH) 105; 6) a graphics controller 106; 7) a display/screen 107 (of which different types exist such as Cathode Ray Tube (CRT), TFT, LCD, etc.). The one or more processors 101 execute instructions in order to perform whatever software routines the computing system implements. The instructions frequently involve some sort of operation performed upon data. Both data and instructions are stored in system memory 103 and cache 104. Cache 104 is typically designed to have shorter latency times than system memory 103. For example, cache 104 might be integrated onto the same silicon chip(s) as the processor(s) and/or constructed with faster SRAM cells whilst system memory 103 might be constructed with slower DRAM cells.

By tending to store more frequently used instructions and data in the cache 104 as opposed to the system memory 103, the overall performance efficiency of the computing system improves. System memory 103 is deliberately made available to other components within the computing system. For example, the data received from various interfaces to the computing system (e.g., keyboard and mouse, printer port, PLAN port, modem port, etc.) Or retrieved from an internal storage element of the computing system (e.g., hard disk drive) are often temporarily queued into system memory 103 prior to their being operated upon by the one or more processor(s) 101 in the implementation of a software program.

Similarly, data that a software program determines should be sent from the computing system to an outside entity through one of the computing system interfaces, or stored into an internal storage element, is often temporarily queued in system memory 103 prior to its being transmitted or stored. The ICH 105 is responsible for ensuring that such data is properly passed between the system memory 103 and its appropriate corresponding computing system interface (and internal storage device if the computing system is so designed). The MCH 102 is responsible for managing the various contending requests for system memory 103 access amongst the processor(s) 101, interfaces and internal storage elements that may proximately arise in time with respect to one another.

Another computing system component that the MCH 102 may have to deal with (because it requests access to the system memory 103) is the graphics processor 106. The graphics processor 106 can be viewed as a co-processor that "takes on" the responsibility of performing sophisticated instructions associated with the presentation of complex visual images on the computing system's display 107. By removing such responsibility from processor(s) 101, the performance efficiency of the processor(s) is improved. The graphics processor 106 is designed to execute display image specific instructions so that display image specific software routines can be executed.

That is, the display image specific software routines are typically written in a language or format that can be broken down into instructions that the graphics processor can execute. Examples of such display image specific software languages/formats include Openly and D3D. In a typical case, a software driver beneath the main operating system (OS) (noting that the main OS is substantially executed on the processor(s) 101) is responsible for ensuring that instructions derived from software written in an display image specific software language/format (e.g., Openly or D3D) are forwarded to the graphics processor 106.

It should be noted that various other computing system architectures that include graphics processors yet depart from the particular architecture observed in FIG. 1 are possible. As such, the following discussion should not be considered as being automatically limited to the architecture of FIG. 1.

FIGURES

The various embodiments of the present invention are illustrated by way of example, and not by way of limitation, in the FIGURES of the accompanying drawings and in which:

FIG. 9b shows an embodiment of a 1D texture map;

FIG. 9c shows an embodiment of a 4×4 2D texture map used to represent the 1D texture map of FIG. 9a;

FIG. 9d shows an embodiment of a 2×8 2D texture map used to represent the 1D texture map of FIG. 9a.

DETAILED DESCRIPTION

Device Drivers For Graphics Processors

As the display image specific software that can be executed by a graphics processor may be complex in and of itself, the use of pre-prepared basic functional building blocks may reduce software development time. That is, by incorporating a pre-prepared basic software function (e.g., "rotate image with 3D perspective") into a comprehensive display image software routine—at least the development time of the basic software function itself is saved. If multiple basic functions are made available, the overall development time can be substantially reduced. A pre-prepared basic software function that can be re-used for different applications is often referred to as a device driver. A collection of such basic functions is often referred to as device drivers.

Figure 1:
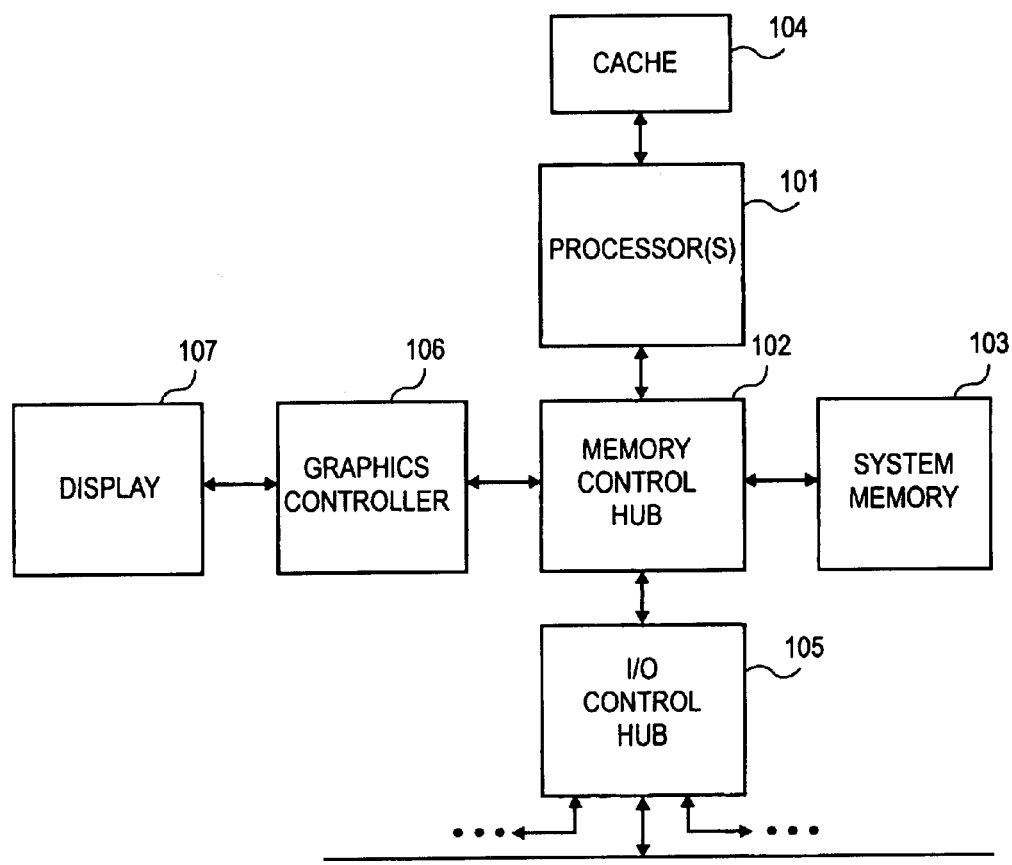
FIG. 1 shows a depiction of a computing system.
Figure 2:
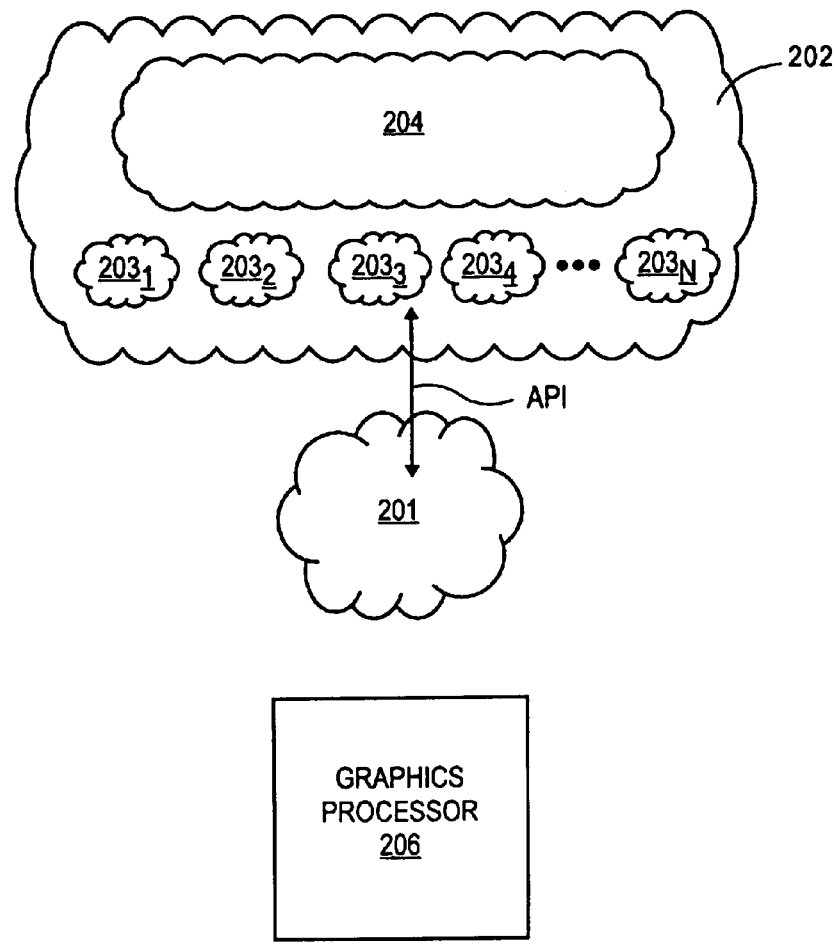
FIG. 2 shows a depiction of a graphics processor software.

FIG. 2 attempts to depict the idea that device drivers may be incorporated into a more comprehensive display image software routine. According to FIG. 2, the aforementioned display image specific software language or format (e.g., Openly, D3D) can be viewed as a form of operating system 201 that "runs on" the graphics processor 206 and has it own associated Application Programmer's Interface (API) (e.g., an Openly API, a D3D API). The display image software that is directed to a particular application 202 (e.g., the imaging software for a particular video game) typically makes use of software 204 that is custom made for the particular application and device drivers $203_1$ through $203_N$. The device drivers $203_1$ through $203_N$, being a collection of basic functions, are drawn at a lower (i.e., more basic) level that the custom tailored software 204 and may also be viewed as a form of middle ware that exists between the custom tailored software 204 and the routines that the most basic language or format software 201 is comprised.

Graphics Processor Design

Graphics processor semiconductor chips may be designed, at least for images having a three dimensional perspective, to construct a body of information that is referred to in the art as a "surface". A surface is often understood to be a full description of only a piece of an overall image having a three dimensional perspective. As described in more detail below, a surface can be constructed by applying a number of features and/or tasks (e.g., scissoring, rasterizing, texturing, coloring) toward a "primitive" (e.g., a line, a triangle, a polygon, etc.). The basic idea is that a three dimensional drawing can be "rendered" as an ensemble of different surfaces (e.g., a number of different primitives each having its own characteristic set of features). The more surfaces that can be included in a drawing the more enriched or detailed the drawing will appear; and, the faster these surfaces can be generated the more fluid rendered motion will appear.

As alluded to just above, the processing involved in the construction of a surface can largely be viewed as the application or association of various procedures and/or computations to its underlying primitive. A pipeline, such as the exemplary pipeline presented in FIG. 3, can process multiple primitives or portions thereof simultaneously (by applying each pipeline stage to a different primitive or portion thereof in a single pipeline cycle). It should be noted that, with respect to graphics processor design, alternative pipeline architectures are possible; and, moreover, pipeline architectures are not an absolute necessity and/or may be implemented and/or enhanced with software. The following discussion of the pipeline of FIG. 3 is provided so that some of the basic procedures and/or computations that may be applied or associated to a primitive can be understood.

Figure 3:
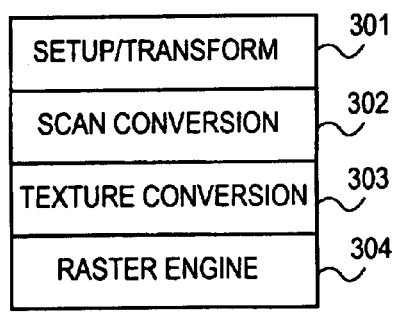
FIG. 3 shows a depiction of a graphics processor pipeline.

Accordingly, the Setup/Transform stage 301 of the pipeline of FIG. 3 is responsible for presenting a breakdown of a primitive to the Scan Conversion stage 302. Here, if a primitive is viewed as a "connect-the-dots" drawing, a separate "vertex" can be identified at each dot in the drawing and an "edge" can be identified for each line connecting dots in the drawing. In an embodiment, each vertex has associated data; and, the Setup/Transform stage 301 is responsible for fetching and processing this data in preparation for the Scan Conversion stage 302. Other processing tasks that may be performed by the Setup/Transform stage 301 include "scissoring".

Here, graphics computing often involves the comprehension of an overall image that is larger than what the screen can actually present. Likewise, the image processed by the software and graphics processor involves primitives that extend into a field or area that is outside the computing system screen's displayable area. Scissoring involves cutting away at those primitives that extend beyond the displayable screen area but remain within a "guardband" area that immediately surrounds the displayable screen area. The Scan Conversion stage 302 is responsible for defining, from the primitive's vertex and edge data, precise pixels that will be used to render the image of the primitive's corresponding surface on the computing system screen.

The Texture Conversion stage 303 applies appropriate "texture" (e.g., image, pattern or video) to the surface so that the surface will possess a called for look. For example, if the overall screen wide image to be rendered is that of torus (i.e., a three dimensional object having the shape of a doughnut) that is wallpapered with a newspaper page, "texture mapping" is used to effectively wallpaper the newspaper image/ pattern to the torus. The resulting image would show the words of the newspaper page wrapping around the curves of the torus to give the image three dimensional perspective. Here, noting that the torus can be broken down into a plurality of smaller surfaces with each surface having its own corresponding primitive, the Texture Conversion stage 303 (through texture mapping) will effectively wallpaper each primitive with the appropriate region of the newspaper page (i.e., map certain newspaper words or portions thereof to the primitive of the appropriate surface).

The Raster Engine 304 calculates the appropriate color for each pixel in the corresponding surface. In a typical processing scheme, after a surface is constructed by the pipeline it is stored into a memory resource (e.g., system memory or a cache local to the graphics processor). The surfaces are then recalled and further processed when needed for actual on screen presentation.

Line Stipple Pattern Emulation Through Texture Mapping

Figures 4, 5:
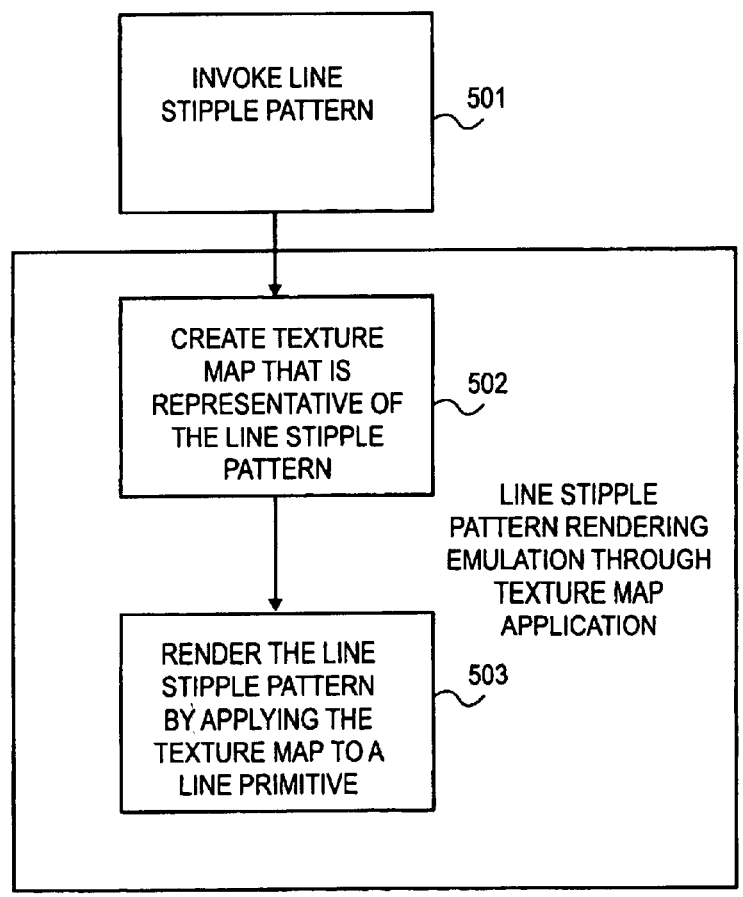
FIG. 4 shows a depiction of a line stipple pattern.
FIG. 5 shows a depiction of a methodology in which line stipple patterns are rendered by emulation through texture mapping.

FIG. 4 shows a depiction of a line stipple pattern 402 that is rendered on a computer screen and a corresponding data structure 401 that may be used by the underlying graphics processor to render the line stipple pattern 402. Line stipple patterns are used to display a line having an appearance that resembles thread stitched through fabric. In a typical implementation, continuing with the stitched fabric analogy, a first binary value (e.g., a "1") is used to represent discrete sections of the thread that the viewer sees above the fabric; and, a second binary value (e.g., a "0") is used to represent discrete sections of the thread that the viewer cannot see because it is underneath the fabric. In a computing system, the above described "stitching" is rendered by illuminating (also referred to as "drawing") those pixels representing seeable "thread sections" and by not illuminating (i.e., "not drawing") those pixels representing non seeable "thread sections".

FIG. 4 demonstrates such an implementation through comparison of the data structure 401 and the rendered pattern 402. That is, each pair of drawn pixel locations is represented by a solid line in the rendered image 402 and each pair of non drawn pixel locations is represented by "break" in the line image 401. Correspondingly, the data structure 401 shows a pair of 1s for each pair of drawn pixel locations and shows a pair of 0s for each pair of non-drawn pixel locations. According to traditional approaches, line stipple patterns are rendered by sequentially processing the data structure from end to end. Here, the line stipple pattern is actually rendered by the graphics processor having circuitry designed to: 1) lookup a value in the data structure too see if its corresponding pixel should be drawn or not; and, 2) increment a counter so the next coordinate value in the data structure can be looked up to see if its corresponding pixel is drawn. That is, the data structure elements are read strictly "in order" (i.e., "sequential end-to-end").

Sequential end-to-end processing of a line stipple pattern's corresponding data structure may result in the corresponding line image to be cumbersome or impossible to render on screen—at least for certain graphics processor architectures. For example, a graphics processor might be designed to render sequences of surfaces in a direction that conflicts with the directionin which a line stipple pattern is supposed to be rendered by way of the sequential looking up activity (e.g., a stippled line should be rendered from bottom to topbut the graphics processor is to render surfaces from top to bottom). Accordingly, allowing a line stipple pattern to be rendered in a more piecewise fashion rather than a forced, sequential end-to-end fashion would provide a more forgiving processing environment.

Better said, by being able to define or construct a stippled line as discrete pieces, the line can be processed "out-of-order" (e.g., a middle piece of the line is processed before either end pieces of the line are processed) rather than only strictly "in order". As such, any mis-direction as between the direction of a stippled line and the direction used to layout the total image to be displayed on screen should be immaterial. Here, representing the stippled line image with a texture map provides a graphics processing scheme in which a line stipple pattern can be rendered in a piecewise fashion. As described in the background, a texture map can be used to "wallpaper" image, pattern or video texture to a primitive. Accordingly, by wallpapering different sections of a line primitive with imagery that is representative of the stipple pattern at each corresponding section, a stippled line pattern can be rendered ad hoc in a piecewise fashion rather than in a forced sequential from end-to-end fashion.

FIG. 5 shows an embodiment of a methodology that can be used to render a line stipple pattern through texture mapping. According to the methodology of FIG. 5, a line stipple pattern is invoked in 501; and, the line stipple pattern is rendered by emulation through texture map application. The emulation involves: 1) creating a texture map that is representative of the line stipple pattern 502; and, 2) rendering the line stipple pattern by applying the texture map to a line primitive 503. According to various embodiments, the created texture map 502 is to be used for the entire end-to-end length of the line stipple pattern to be rendered. Then, an appropriate section of the texture map is identified for application to a specific line primitive; where, the specific line primitive is representative of just a section of the entire end-to-end length of the line stipple pattern to be rendered. As the different sections may be rendered on the computing screen out of order with respect to one another in order to effect piecewise construction, the different corresponding sections of the texture map may be made retrievable in a random access fashion for their subsequent application.

For example, recalling the discussion of the graphics processing pipeline presented in the Background with respect to FIG. 3, a separate line primitive is run through the pipeline for each separate section of the entire end-to-end line stipple pattern. The Texture Conversion stage 303 is responsible for applying the appropriate section of the texture map for each line primitive that is run through the pipeline (e.g., after randomly accessing the appropriate section from the larger texture map that was previously created 502). Note that graphics processors designed to produce surfaces for rendering (e.g., as described in the Background with respect to the graphics processing pipeline of FIG. 3) allow a line primitive to be viewed as corresponding to the production of a one dimensional (1D) surface.

With the understanding that smaller pieces of a larger texture map are applied to unique line primitives that each represent a different piece of the entire end-to-end line stipple pattern, the following discussion of FIGS. 6a through 10d are directed to different ways in which the texture map may be created 520. According to FIG. 6a, a line stipple pattern is invoked 601. Invocation of a line stipple pattern is an event where the need to create a line stipple pattern is recognized. Typically, the invoking of a line stipple pattern 601 arises from the software that is being executed on the graphics processor. In various embodiments, the invoking of the line stipple pattern further includes a description of the line stipple pattern to be created. A 1D texture map can then be created from the description For example, according to at least the Open language, the invoking 601 of a line stipple pattern includes a "pattern" parameter and a "factor" parameter. The proper pattern for the line stipple pattern is created by expanding each bit in the pattern by the factor. FIG. 6b shows an example. FIG. 6b shows an embodiment of a specified pattern 605 "1111000011110000" and a factor 606 of "3". Data structure 607 corresponds to the resultant line stipple pattern's corresponding data structure. From FIG. 6b it is clear that the line stipple pattern data structure 607 can be created by expanding each bit in the specified pattern 605 by the replication factor 606. According to the methodology of FIG. 6b, the same process is applied 603—but is used to create a 1D texture map. Note that the specified pattern size is 16 and the factor is 3 which results in a corresponding data structure size of 48 for the rendered line stipple pattern (i.e, 16×3=48).

Sequential prior art line stipple pattern rendering sequences are configured to be circular if the rendered line stipple size is greater than the Factor x Specified Pattern_ size. That is, for as long as the line needs to be drawn—even exceeding a size of Factor x Specified Pattern_size, the first bit in the line stipple pattern's corresponding data structure 607 is looked up, as the "next bit" in the sequential look up scheme, after the last bit in the line stipple pattern's corresponding data structure 607 is looked up. By contrast, piecewise construction of a line stipple pattern need not adhere to a circularly sequential rendering process; yet, given that the specified pattern 605 and factor 606 are written in software with the understanding that the resultant line stipple pattern data structure 607 is to be repeated for line sizes greater than Factor x Specified Pattern_size, the piecewise construction process should still account for line sizes greater than Factor x Specified Pattern_size.

Figure 6A:
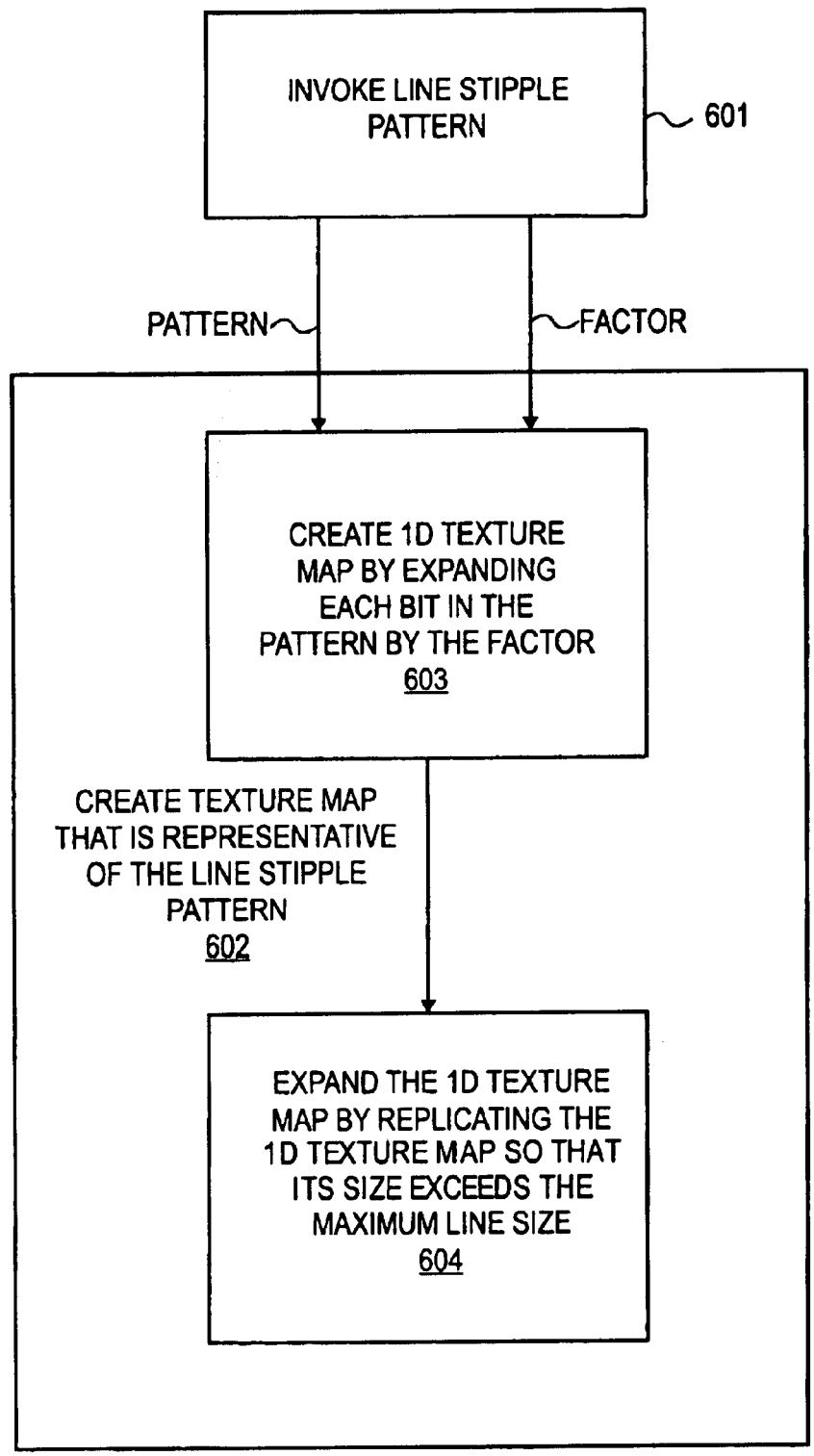
FIG. 6a shows an embodiment of a methodology to create a texture map that is representative of a line stipple pattern.
Figure 6B:
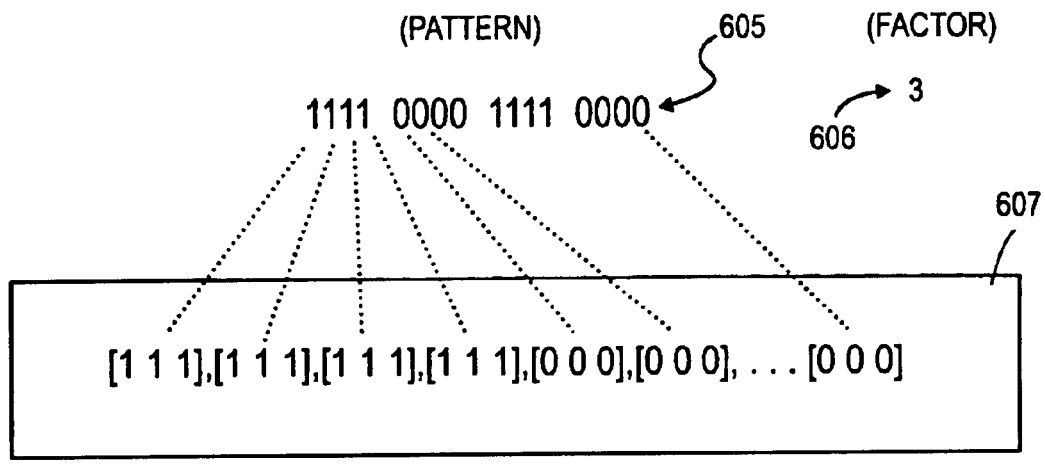
FIG. 6b shows an embodiment of a 1D basic texture map formed by expanding the bits of a basic line stipple pattern by a factor.
Figure 6C:
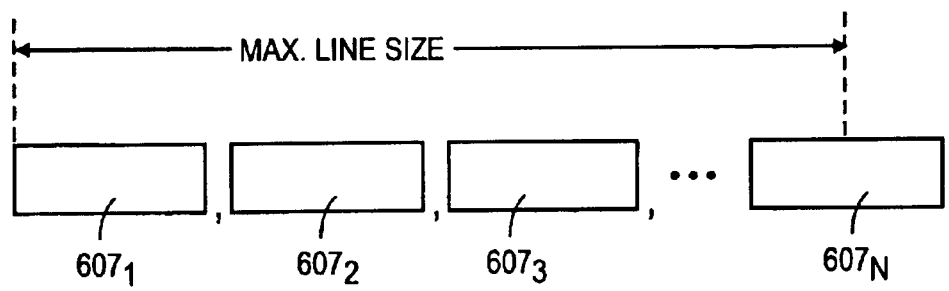
FIG. 6c shows a larger texture map formed by repeating the basic texture map of FIG. 6b.

The exemplary methodology of FIG. 6a accounts for potentially large line stipple renderings by automatically creating a 1D texture map whose size exceeds (or is at least equal to) the maximum possible rendered line size. By creating a 1D texture map that is at least as long as the maximum possible rendered line size, the 1D texture map is guaranteed to be long enough to have a texture bit for each pixel associated with the line. In a sense, creating a 1D texture map that equals or exceeds the maximum line size effectively creates a texture map that can handle a "worst case" rendered line size. Accordingly, the 1D texture map is expanded 604 by replicating the line stipple pattern data structure 607 that is defined by the "pattern" and "factor" parameters until the size of the 1D texture map exceeds or at least equals the maximum line size. FIG. 6c shows an example. According to the depiction of FIG. 6c, the line stipple pattern data structure 607 is repeated N times (through data structures $607_1$, $607_2$, $607_3$, ... $607_N$) until the maximum line size is exceeded. The maximum line size is typically governed by the screen size.

Large 1D Texture Map Representation with 2D Texture Maps

Figure 7:
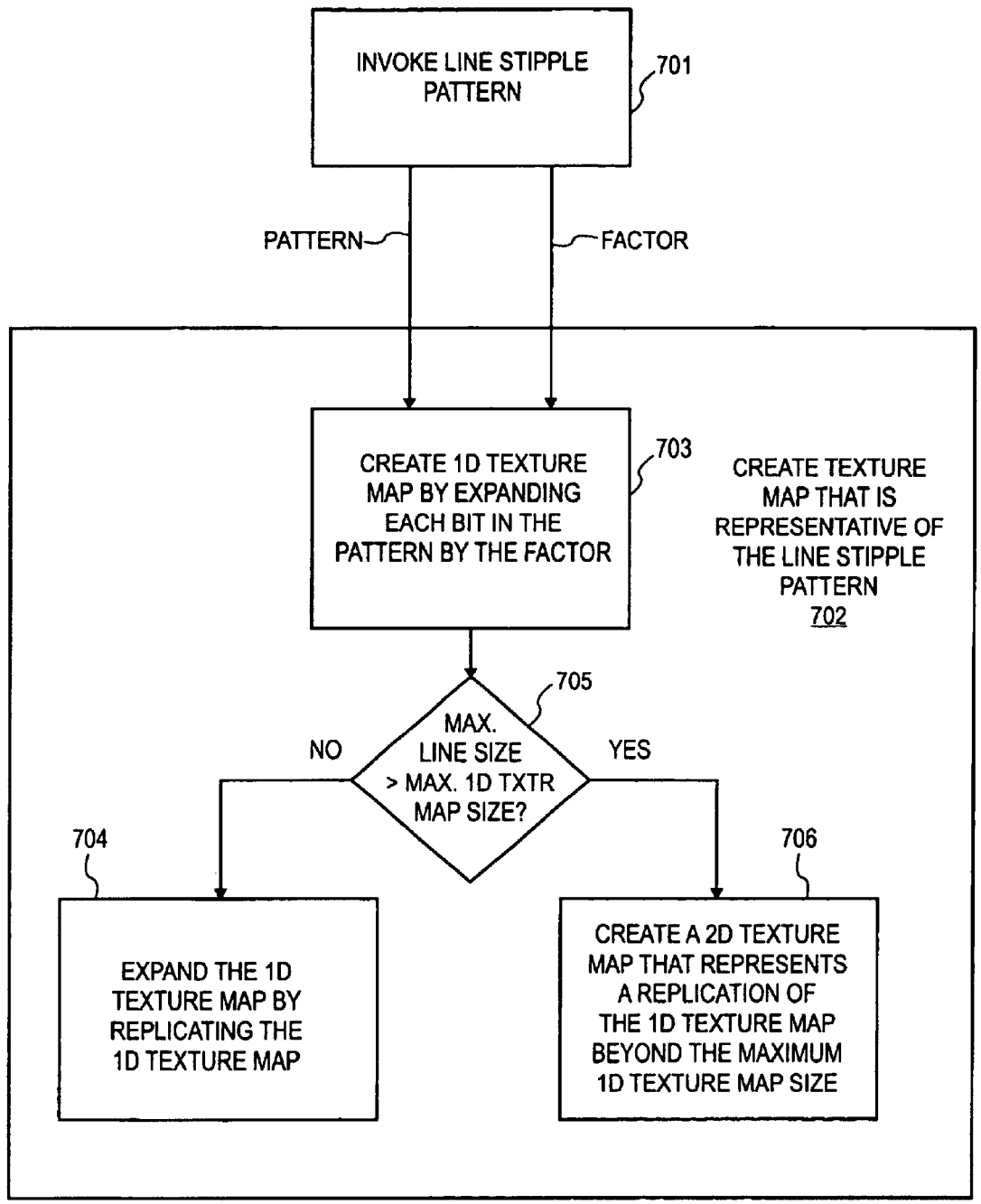
FIG. 7 shows another embodiment of a methodology to create a texture map that is representative of a line stipple pattern.

Unfortunately, some graphics hardware architectures may possess a limited maximum allowable 1D texture map size that prevents the size of the 1D texture map from exceeding the maximum line size. FIG. 7 provides a methodology that allows this problem to be worked around. Specifically, the methodology of FIG. 7 maps a large 1D texture map into a 2D texture map 706. Here, as a 2D texture map has an extra dimension beyond a 1D texture map, the creation of 2D texture maps tends to involve the storage of more information than the creation of 1D texture maps. As such, a graphics processor is often designed so as to allow more information to be recorded for the creation of a 2D texture map than a 1D texture map. Therefore, in order to get around the problem of having insufficient 1D texture map resources, the resources associated with the storage and retrieval of a 2D texture map are used to store and retrieve elements of a "long" 1D texture map.

The methodology of FIG. 7 can be viewed as a first embodiment in which an inquiry 705 is made to see if the maximum resources used to store and retrieve 1D texture map elements are sufficient to store a texture map usable against the maximum possible rendered line size. If so, a 1D texture map is created 704. If not, the resources associated with 2D texture map storage and retrieval are used to effectively store and retrieve the elements a long 1D texture map 706. Note that for simplicity, the embodiment of FIG. 7 assumes that the invoking 701 of a line stipple pattern involves specification of a pattern and a factor. Likewise, similar to the methodology of FIG. 6a, a basic data structure is created by expanding each bit in the pattern by the factor 703. Note that the use of 2D texture map resources for the storage and retrieval of 1D texture map information may be employed even if the invoking of a line stipple pattern does not involve a pattern and factor specification.

Moreover, the inquiry 705 may alternatively be made during initialization of the graphics processor or the computing system. Here, different graphics processors may be designed to support a wide range of different screens. As such, some graphics processors may be designed into computing systems having a screen type that does not drive the maximum line size beyond the 1D texture map resources; while other graphics processors of the same type may be designed into computing systems having a screen type that does drive the maximum line size beyond the 1D texture map resources. The methodology of FIG. 7 allows a graphics processor to be suitably configured according to whatever system a graphics processor happens to be integrated into.

Figure 8:
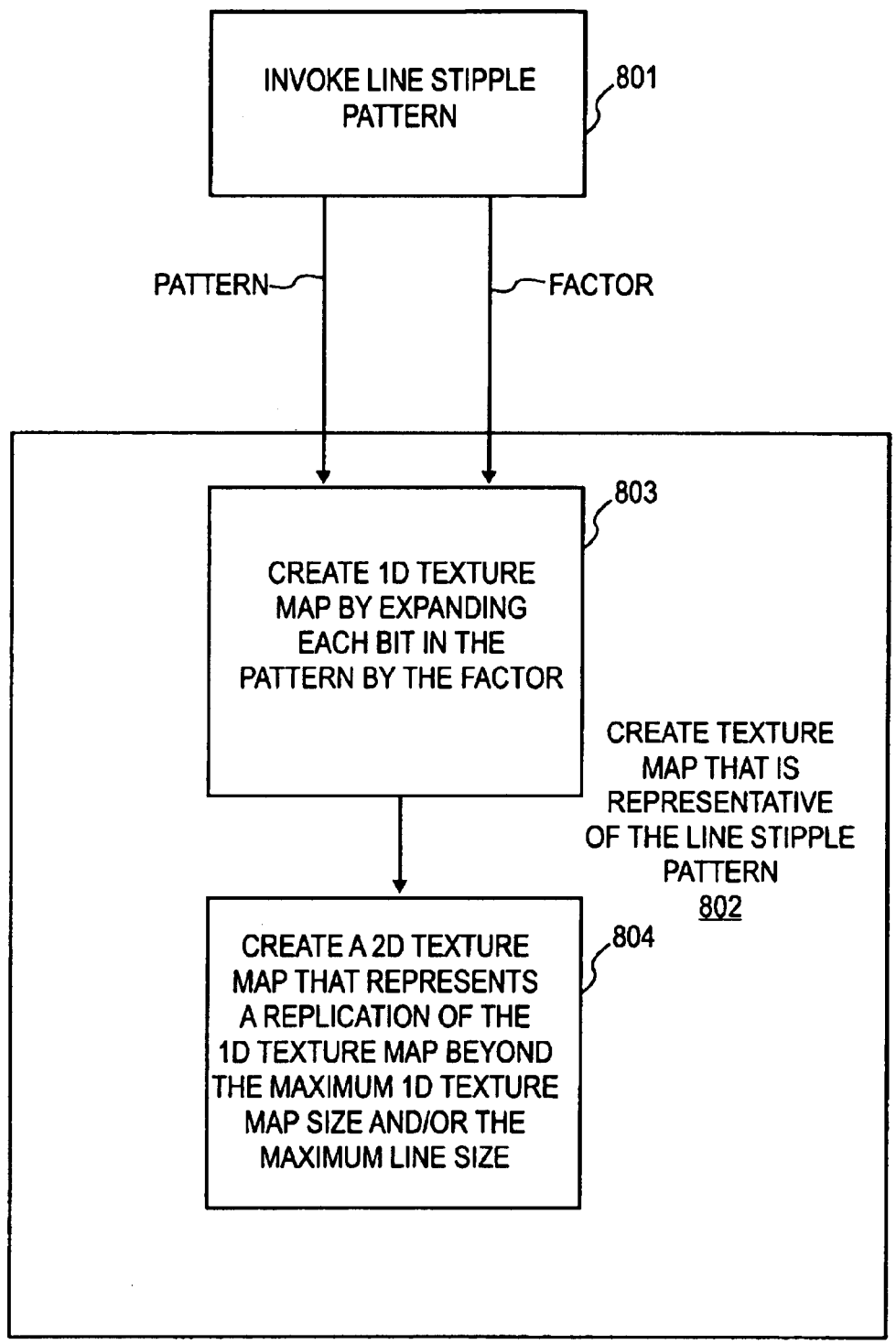
FIG. 8 shows another embodiment of a methodology to create a texture map that is representative of a line stipple pattern.

A more basic approach is to refrain from any inquiry 705 and to simply use the 2D texture map resources for all cases. FIG. 8 shows an embodiment of such a methodology in which the 1D texture map material is automatically recorded with 2D texture map resources irrespective of the maximum allowable size of a 1D texture map 804. and the maximum possible rendered line size Similar to the methodology of FIG. 6a, a basic data structure is created by expanding each bit in the pattern by the factor 803. Again, note that the use of 2D texture map resources for the storage and retrieval of a 1D texture map information may be employed even if the invoking of a line stipple pattern does not involve specification of a pattern and factor.

With the realization that the information of a large 1D texture map can be effectively stored and retrieved with resources that are typically used to store 2D texture maps, it behooves a device driver to transparently convert a lookup reference directed to a 1D texture map into suitable 2D texture map coordinates. For example, in one possible instance, custom tailored application software and/or device driver software may control the order in which the surface pieces of a piecewise constructed line stipple pattern are created; and, in so-doing, initially make reference to 1D compatible index values. Recognizing, however, that the 1D texture map is actually retrieved through 2D texture map resources, the device driver is further configured to convert the 1D compatible index value into an appropriate 2D reference so that the correct information can be retrieved and applied to the line primitive.

Figure 9A:
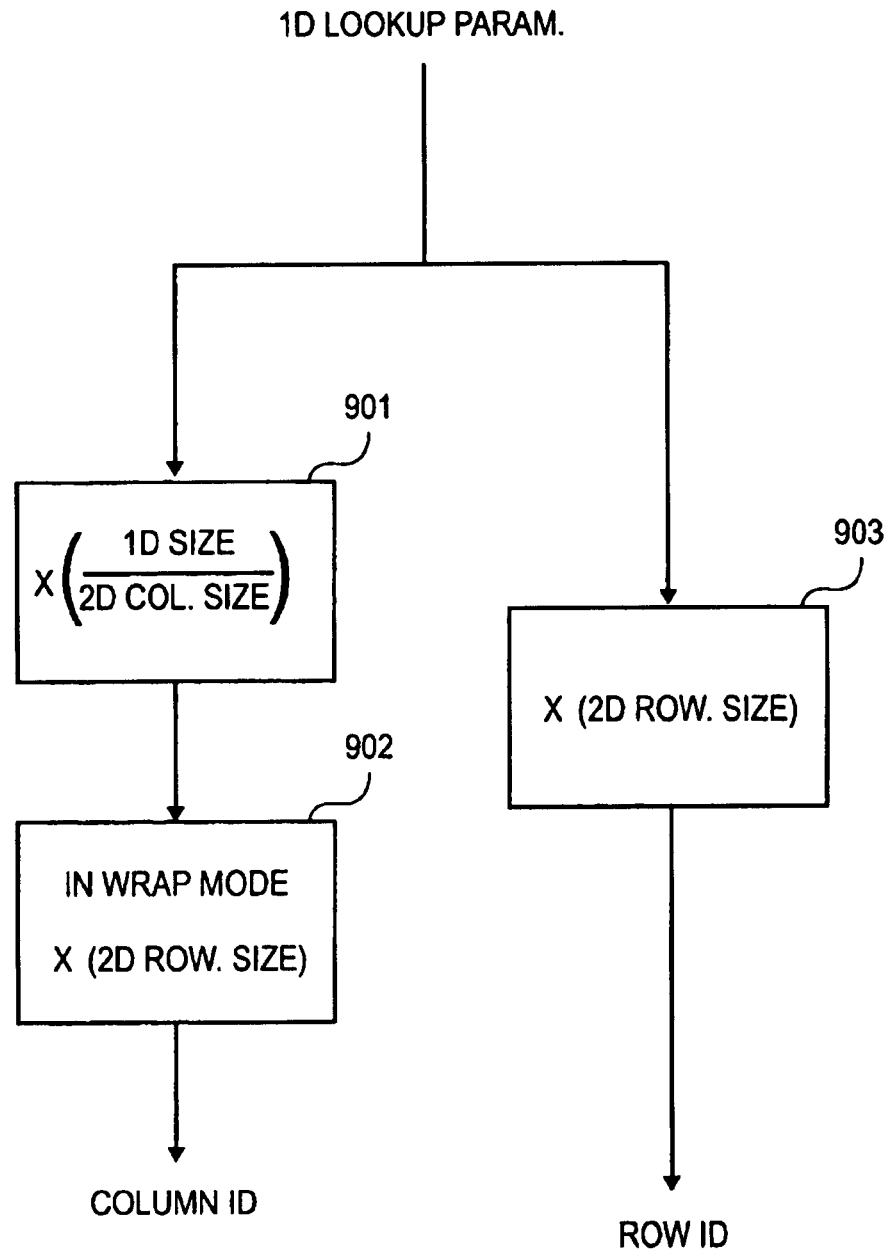
FIG. 9a shows an embodiment for looking up the correct value from a 2D texture map that is representative of a large 1D texture map.

FIGS. 9a though 9d may be used to help describe such a 1D/2D index translation methodology. However, before discussing 1D/2D index translation methodology; first, a brief discussion of index values will be provided by reference to FIGS. 9b and 9c. FIG. 9b shows a 1D texture map of size 16. Any single element or range of elements can be looked up from the 1D texture map by use of an appropriate index value (for a single element) or range of index values (for a range of elements). In a typical embodiment, the complete range for a 1D texture map is 0.0 to 1.0. Thus, for example, a scalar index value of 0.43 could be used to look up the element "6" from the 1D texture map of FIG. 16b (i.e., $7/16=0.43$). By contrast, in a 2D texture map embodiment, the index value has two dimensions: a column index and a row index. Moreover, according to a family of embodiments, increments are made in integer values rather than fractional values. For example, a column index value of 0.X would specify a first column, a column index value of 1.X would specify a second column, a column index value of 2.X would specify a third column, etc. Likewise, a row index value of 0.X would specify a first row, a row index value of 1.X would specify a second row, a row index value of 2.X would specify a third row, etc.

FIG. 9a demonstrates a methodology that may be used to covert a 1D index ("1D lookup parameter") into a 2D index ("column ID" and "row ID"). The methodology of FIG. 9a works for a wide range of 2D texture map dimensions. As a demonstration of this property, the methodology of FIG. 9a will be "worked out" for the 4×4 2D texture map implementation (of the 1D texture map of FIG. 9b) of FIG. 9c and the 2×8 texture map (of the 1D texture map of FIG. 9b) of FIG. 9d. In both cases, the 1D index value of 0.43 will be converted so as to properly retrieve the element "6" from both 2D texture maps. According to the conversion methodology of FIG. 9a, turning first to an example where the targeted 2D texture map is the 4×4 texture map implementation of FIG. 9c, the column index value is generated by: 1) factoring the 1D index value by the ratio of the 1D texture map size to the 2D texture map column size 901; and, 2) in a "wrap" mode, factoring the resultant of the above factoring 901 by the 2D texture map row size 902. The row index value is generated by factoring the 1D index value with the 2D row size 903.

Thus, for the 4×4 targeted 2D texture map and for a lookup value of 0.43, the first column index factoring 901 would produce a value of 1.72. That is, the ratio of 1D texture map size (16) to 2D texture map column size (4) corresponds to a factoring of 4 (i.e., $16/4=4$) and 0.43 which equals 1.72. The second process 902 refers to a "wrap" mode. A wrap mode is a mode where the integer value of an input parameter is ignored (e.g., by being set equal to 0).

Thus, the wrap mode effectively converts 1.72 to 0.72; and, the factoring 902 by the 2D row size (4) produces a column index value of 2.88 (i.e., 0.72×4=2.88). A column index value of 2.88, being of the form "2.X", corresponds to the third column of the 4×4 2D texture map of FIG. 9*c*. Note that the element "6" is located in the third column of the texture map of FIG. 9*c*. The row index value is determined 903 by factoring the 1D index (0.43) with the 2D row size (4) which corresponds to a value of 1.72 (i.e., 0.43×4=1.72). A value of 1.72, being of the form "1.X", corresponds to the second row of the 4×4 texture map. Thus, the 1D texture map index of 0.43, which identifies element "6", is converted into a row index ("1.X") and a column index ("2.X") that identifies the second row and third column of the 4×4 2D texture map: which is precisely where the element "6" is located.

For the 2×8 targeted 2D texture map of FIG. 9*d*, for a lookup value of 0.43, the first column index factoring 901 would produce a value of 0.86. That is, the ratio of 1D texture map size (16) to 2D texture map column size (8) corresponds to a factoring of 2 (i.e., $^{16}/_{8}$=2) and 0.43 which equals 0.86. The wrap mode of the second process 902 has no consequence because the resultant from the first factoring 901 has an integer value of 0. The factoring 902 by the 2D row size (8) produces a column index value of 6.88 (i.e., 0.86×8=6.88). A column index value of 6.88, being of the form "6.X", corresponds to the seventh column of the 2×8 2D texture map of FIG. 9*d*. Note that the element "6" is located in the seventh column of the texture map of FIG. 9*d*. The row index value is determined 903 by factoring the 1D index (0.43) with the 2D row size (2) which corresponds to a value of 0.86 (i.e., 0.43×2=0.86). A value of 0.86, being of the form "0.X", corresponds to the first row of the 2×8 texture map. Thus, the 1D texture map index of 0.43, which identifies element "6", is converted into a row index ("0.X") and a column index ("7.X") that identifies the first row and seventh column of the 2×8 2D texture map which is precisely where the element "6" is located.

Thus, it is also to be understood that embodiments of this invention may be used as or to support a software program executed upon some form of processing core (such as the Central Processing Unit (CPU) of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
    in order to render, on a display, a line stipple pattern in a piecewise fashion, performing the following with one or more semiconductor chips:
        invoking said line stipple pattern, said invoking including specifying said line stipple pattern with a pattern and a factor;
        after invoking said line stipple pattern, creating a texture map having information that represents said line stipple pattern, said creating comprising creating a 1D texture map by expanding each bit in said pattern by said factor; and
        for each of a plurality of line primitives that each represent a different section of said line stipple pattern:
        mapping a section of said texture map's information to its corresponding line primitive.

2. The method of claim 1 further comprising expanding said 1D texture map through replication until its size is sufficient to entertain a maximally sized displayable line.

3. The method of claim 2 further comprising said expanding said 1D texture map through replication only if said maximally sized displayable line can be entertained by a maximally sized 1D texture map.

4. The method of claim 2 further comprising creating a 2D texture map to represent said 1D texture map if said maximally sized displayable line can not be entertained by a maximally sized 1D texture map.

5. The method of claim 1 wherein said texture map is a 1D texture map.

6. The method of claim 1 wherein said texture map is a 2D texture map.

7. The method of claim 1 wherein said mapping further comprises mapping with a stage in a graphics processor pipeline.

8. The method of claim 7 further comprising fetching said section of said texture map prior to said mapping.

9. A method comprising:
    rendering a line stipple pattern on an LCD type display in a piecewise fashion by performing the following with one or more semiconductor chips:
    invoking said line stipple pattern, said invoking including specifying said line stipple pattern with a pattern and a factor;
    after invoking said line stipple pattern, creating a texture map that represents said line stipple pattern, said creating comprising creating a 1D texture map by expanding each bit in said pattern by said factor; and
    for each of a plurality of line primitives that each represent a different section of said line stipple pattern:
    mapping a section of said texture map to its corresponding line primitive.

10. The method of claim 1 further comprising expanding said 1D texture map through application until its size is sufficient to entertain a maximally sized displayable line.

11. The method of claim 10 further comprising said expanding said 1D texture map through replication only if said maximally sized displayable line can be entertained by a maximally sized 1D texture map.

12. The method of claim 10 further comprising creating a 2D texture map to represent said 1D texture map if said maximally sized displayabl line can not be entertained by a maximally sized 1D texture map.

13. The method of claim 9 wherein said texture map is a 1D texture map.

14. The method of claim 9 wherein said texture map is a 2D texture map.

15. The method of claim 9 wherein said mapping further comprises mapping with a stage in a graphics processor pipeline.

16. The method of claim 15 further comprising fetching said section of said texture map prior to said mapping.

17. A machine readable medium having a sequence of instructions which when executed by a graphics processor cause said graphics processor to perform a method, said method comprising:

in order to render, on a display, a line stipple pattern in a piecewise fashion by performing the following with said graphics processor:

invoking said line stipple pattern, said invoking including specifying said line stipple pattern with a pattern and a factor;

after invoking said line stipple pattern, creating a texture map having information that represents said line stipple pattern, said creating comprising creating a 1D texture map by expanding each bit in said pattern by said factor; and for each of a plurality of line primitives that each represent a different section of said line stipple pattern:

mapping a section of said texture map is information to its corresponding line primitive.

18. The machine readable medium of claim 17 wherein said method further comprises expanding said 1D texture map through replication until its size is sufficient to entertain a maximally sized displayable line.

19. The method of claim 18 further comprising said expanding said 1D texture map through replication only if said maximally sized displayable line can be entertained by a maximally sized 1D texture map.

20. The machine readable medium of claim 18 further comprising creating a 2D texture map to represent said 1D texture map if said maximally sized displayable line can not be entertained by a maximally sized 1D texture map.

21. The machine readable medium of claim 17 wherein said texture map is a 1D texture map.

22. The machine readable medium of claim 17 wherein said texture map is a 2D texture map.

23. The machine readable medium of claim 17 wherein said sequence of instructions are based on program code written in one of the following:

Open GL

D3D.

* * * * *

UNITED STATES PATENT AND TRADEMARK OFFICE
CERTIFICATE OF CORRECTION

| | | |
|---|---|---|
| PATENT NO. | : 7,280,114 B2 | Page 1 of 1 |
| APPLICATION NO. | : 10/611270 | |
| DATED | : October 9, 2007 | |
| INVENTOR(S) | : Poddar | |

It is certified that error appears in the above-identified patent and that said Letters Patent is hereby corrected as shown below:

In column 1, at line 35, delete "PLAN" and insert --LAN--.

In column 1, at line 35, delete "Or" and insert --or--.

In column 2, at line 5, delete "Openly" and insert --OpenGL--.

In column 2, at line 10, delete "Openly" and insert --OpenGL--.

In column 3, at line 9, delete "Openly" and insert --OpenGL--.

In column 3, at line 12, delete "Openly" and insert --OpenGL--.

In column 6, at line 20, delete "Open" and insert --OpenGL--.

In column 10, at line 46, delete "1" and insert --9--.

In column 11, at line 16, delete "map is" and insert --map's--.

Signed and Sealed this

Twenty-seventh Day of May, 2008

JON W. DUDAS
*Director of the United States Patent and Trademark Office*